United States Patent [19]
Thompson

[11] Patent Number: 4,814,984
[45] Date of Patent: Mar. 21, 1989

[54] COMPUTER NETWORK SYSTEM WITH CONTENTION MODE FOR SELECTING MASTER

[75] Inventor: Roger D. Thompson, Woking, Great Britain

[73] Assignee: International Computers Limited, London, England

[21] Appl. No.: 33,820

[22] Filed: Apr. 3, 1987

[30] Foreign Application Priority Data

May 30, 1986 [GB] United Kingdom ............ 8613152

[51] Int. Cl.[4] .................. G06F 13/36; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,209,838 | 6/1980 | Alcorn, Jr. et al. | 364/200 |
| 4,387,425 | 6/1983 | El-Gohary | 364/200 |
| 4,466,058 | 8/1984 | Girard et al. | 364/200 |
| 4,470,112 | 9/1984 | Dimmick | 364/200 |
| 4,536,838 | 8/1985 | Ringel et al. | 364/200 |

Primary Examiner—Eddie P. Chan
Attorney, Agent, or Firm—Lee & Smith

[57] ABSTRACT

A computer network is described, consisting of a number of computers connected by a bus. Each computer in turn becomes master, and can send messages to the other computers. When it is finished its turn as master, it passes control on to the next computer by means of a relinquish message. Each computer, when it is not master, monitors the bus for messages destined for it. If it does not detect any messages within a predetermined time interval, it enters a contention mode in which it repeatedly sends a message until either (a) it receives a response to the message in which case it becomes master or (b) it receives another message, in which case it becomes a slave. Each computer sends the contention messages at a different repetition rate, chosen such that, whatever the initial phasing of the contention messages, one message from one computer will always get through within a predetermined number of transmission attempts.

9 Claims, 8 Drawing Sheets

CONTENTION MODE

| F | SA | CB =10 | L | DA =10 | PA | ES | FC =0 | T | NR | C | F |

FIG. 3a  RELINQUISH MESSAGE

| F | SA | CB =10 | L | DA =10 | PA | ES | FC =1,2 | C | F |

FIG. 3b  INITIALISE MESSAGE

| F | SA | CB =73 | C | F |

FIG. 3c  RESPONSE TO INITIALISE MESSAGE

| F | SA | CB =10 | L | D =11 | PA | DATA | C | F |

FIG. 3d  NETWORK MESSAGE

| F | SA | CB |

FIG. 3e  RESPONSE TO NETWORK MESSAGE

FIG.4

FIG.5 STARTUP MODE

FIG. 6 CONTENTION MODE

FIG.7 SLAVE MODE

FIG. 8 MASTER MODE

FIG. 9 SOLO MODE

COMPUTER NETWORK SYSTEM WITH CONTENTION MODE FOR SELECTING MASTER

This invention relates to computer network systems.

One known computer network system is described in British Pat. No. GB 2 076 190. This describes a system comprising a number of computer stations interconnected by a bi-directional bus. At any given time, one or the stations assumes the role of master, while the other stations are slaves. The master has control of the bus, and can send messages over it to the slaves. The slaves, on the other hand, are not allowed to send messages except in response to a message from the master. This ensures that only one message can be present in the bus at any given time, and thus avoids the possibility of collisions between messages from different stations.

Normally, each station becomes master in turn, and when it has finished using the bus, it sends a message to the next station in a predetermined sequence, informing it that it is now master. However, if the station that is currently the master fails before it has passed control to the next station, the system is left without any master. To deal with this situation, each station continuously monitors activity on the bus, and if no activity is detected for a predetermined time interval, all the stations detecting this condition go into an election mode of operation, so as to decide amongst themselves which sould become the master. In the electron mode, each station sends a first pulse over the bus, and then monitors the bus for a predetermined time period, unique to that station. If it detects another pulse on the bus within this period, it has lost the election, and becomes a slave. If no pulse is detected within this time period, it sends out a second pulse, and assumes the role of master. This second pulse will be received by all the other stations, and will cause them to become slaves. Thus, it can be seen that the winner of the election will be the candidate station with the smallest time period.

This technique relies on the fact that all the stations detect the expiry of the predetermined time interval of inactivity substantially simultaneously, apart from propagation delays over the bus, and hence they all enter the election mode at substantially the same point of time. This in turn means that all the stations must monitor activity on the bus all the time; that is, each station must detect all messages on the bus, whether or not the messages are destined for that station.

However, if the absence of suitable electronics, the fact that each station detects all messages on the bus imposes an additional processing requirement on the stations, since each station must then examine the message to determine whether or not that message is actually destined for it. It is therefore considered preferable, in the absence of such electronics, to arrange for each station to detect only those messages that are actually destined for it, i.e. messages specifically addressed to it or messages that are designated as "broadcast" messages for receipt by all the stations. However, this means that the stations will not necessarily all detect the expiry of the interval of inactivity at the same point of time; this will happen only if the last message prior to the interval of inactivity was a broadcast message. In this case, therefore, it is not possible to use the election method described in the above-mentioned patent specification.

The object of the present invention is to overcome this problem.

SUMMARY OF THE INVENTION

According to the present invention there is provided a computer network system comprising a message bus and a plurality of computers connected to the message bus, each computer having at least a master mode, a slave mode, and a contention mode, each computer comprising:

(a) means operative in the master mode to send messages to the other computers over the bus and then to send a relinquish message to one of the other computers and to enter the slave mode, (b) means operative in the slave mode, for detecting a relinquish message on the bus from one of the other computers and then entering the master mode, (c) means operative in the slave mode, for monitoring the bus for messages destined for this computer and for entering the contention mode in the event that no messages are received within the predetermined time interval, (d) means operative in the contention mode, for repeatedly broadcasting a contention message over the bus at a predetermined repetition rate, the repetition rate for each computer being different from that of any other one of the computers, (e) means operative in the contention mode, in the event that a response to the contention message is received from another one of the computers, for entering the master mode, and (f) means operative in the contention mode, in the event that a contention message is received from another one of the computers, for sending a response to the contention message and entering the slave mode.

BRIEF DESCRIPTION OF THE DRAWINGS

One computer network system in accordance with the invention will now be described by way of example with reference to the accompanying drawings.

DESCRIPTION OF AN EMBODIMENT OF THE INVENTION

Figure 1:
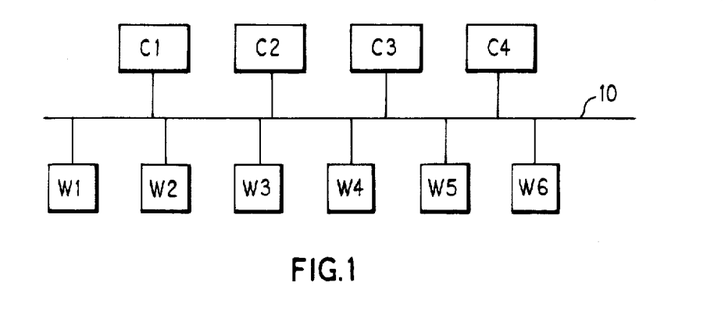
FIG. 1 is a block diagram of the overall system.

Referring to FIG. 1, the computer network system in this particular example comprises four computers C1–C4 interconnected by a bi-directional bus 10. Also connected to the bus 10 are a number of work stations W1–W6. The bus operates at a data rate of 153.6 Kbits/second.

Each work station is of conventional form, consisting of a keyboard on a video display screen. Each computer is considered to own a specified sub-group of the work stations. For example, computer 1 may own work stations 1 and 2, and so on.

In normal operation, each of the computers becomes master in turn, the other computers being slaves. During its turn as master, the computer has control of the bus 10, and may send messages over the bus either to its work stations or to the other computers. The work stations and the slave computers are not allowed to send messages except in response to a message from the master.

The computers are notionally arranged in a ring. When a computer has finished its turn as master, it passes control on to the next computer in the ring, so that this next computer now becomes the master. This is done by means of a special message referred to as a RELINQUISH message.

Each of the computers and work stations has a unique address in the network.

Figure 2:
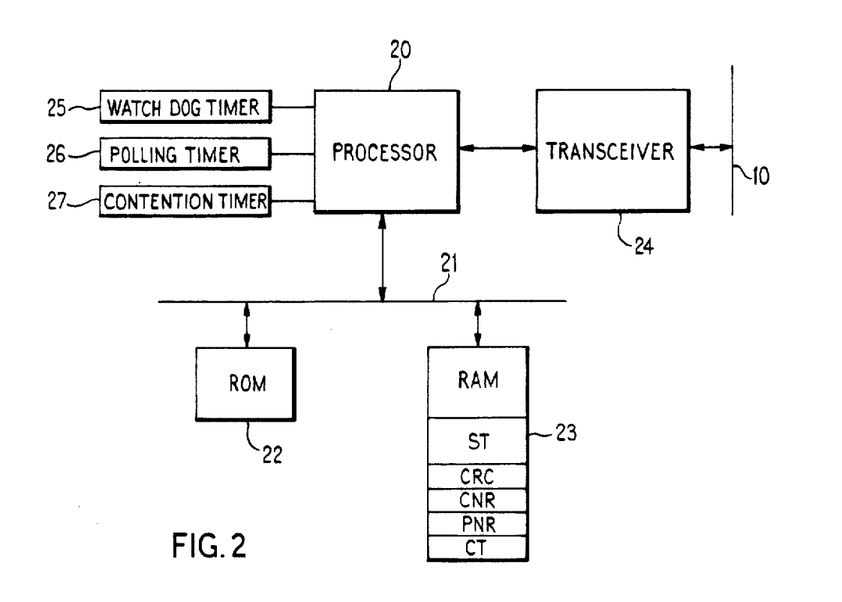
FIG. 2 shows a computer forming part of the system.

Referring now to FIG. 2, this shows one of the computers C1–C4 in more detail.

The computer comprises a processing unit 20 connected by means of an internal bus 21 to a read-only memory (ROM) 22 and random-access memory (RAM) 23. The processing unit 20 is also connected to the network bus 10 (FIG. 1) by way of a transceiver circuit 24.

The transceiver circuit 24 is arranged to detect only messages on the bus 10 directed to this particular computer, i.e. either messages specifically addressed to this computer, or broadcast messages intended to be received by all the computers. The messages detected by the transceiver circuit 24 are passed to the processing unit 20. Other messages are ignored.

The ROM 22 and RAM 23 hold programs for the processing unit 20. The RAM also holds control information, including a state table ST, a contention repeat count CRC, a current network reservation byte register CNR, a previous network reservation byte register PNR, and a current token register CT.

The state table ST contains an entry for each other computer in the system and for each work station belonging to this computer. Each entry contains a state value indicating that the device in question is either in a "connected", "disconnected" or "unknown" state. Each entry also contains a polling count value.

Each computer also includes three timers, referred to as the watchdog timer 25, the polling timer 26, and the contention timer 27.

The purpose of the watchdog timer 25 is to detect situations where no message is received from the other computers for a predetermined period of time. This could be because the computer has just been switched on and the other computers are not yet aware of it. Alternatively, it could be because the current master has failed, or a RELINQUISH message passing the master has been garbled, leaving the system with no master.

Two values are used to start the watchdog timer: a start-up value (5000 milliseconds in this example) which is used when the computer first comes on-line, and an initial value (200 milliseconds in this example) which is used subsequently.

The watchdog timer is started from its initial value each time the computer passes the master on to the next computer in the ring. The timer is switched off when the machine receives the RELINQUISH message and becomes master again, and is reset to its initial value if any other sort of message is received. If the watchdog timer expires, the computer enters a contention mode in which it attempts to assume the role of master. More than one computer in the network may enter the contention mode at approximately the same time. The way in which the contention is resolved so that only one of them becomes master will be described later.

The purpose of the polling timer 26 is to control the rate at which the computer performs polling operations. This timer runs continuously.

Every time the polling timer 26 expires, the computer sends polling messages to all the work stations indicated by the state table as being in the "connected" state, requesting them to return any information entered into their keyboards.

This polling should be carried out at a rate at least as high as the expected keystroke rate, since delays in keyboard response are ergonomically unacceptable. One poll every 40–50 milliseconds has been found to give a keyboard response that is perceived as instantaneous. The time-out period of the polling timer 26 is set at 45 milliseconds in this case.

In order to ensure precedence of polling traffic over network traffic (i.e. traffic other than polling traffic) the following rules are imposed.

(i) No network traffic may be sent if the polling timer has expired, subject to one exception described below.

(ii) A limit is imposed on the length of any one transmission of network traffic, so that if the polling timer expires while a network transfer is in progress, polling is not held up significantly. In the present example, the transmission length is restricted to 512 bytes or less.

To ensure that each computer with network traffic to send gets an opportunity to send it, a network reservation byte NR is included in the RELINQUISH message used to pass control around the ring.

If the reservation byte NR in a received RELINQUISH is zero, the new master is allowed to send network traffic, subject to rules (i) and (ii) above. If all the network traffic has been sent, the reservation byte NR is set to zero when the RELINQUISH is passed on to the next computer. If, on the other hand, the above rules imply that although the computer has further network traffic to send it cannot do so, it sets its own identity number in the reservation byte NR when it passes the RELINQUISH on. In either case, the computer remembers the value of the reservation byte (either zero or its own identity) by storing it in the current network reservation byte register CNR.

If the reservation byte NR in the received RELINQUISH is non-zero, and is not equal to the last recorded value in CNR, then no network traffic may be sent. The value of the reservation byte NR is stored in CNR, and is also copied into the reservation byte of the RELINQUISH message sent to the next computer.

If the reservation byte NR in the received RELINQUISH is non-zero, and is equal to the last recorded value in CNR, the computer may send one network message, subject only to rule (ii) above, regardless of the state of its polling timer. The register CNR is reset to zero, and the reservation byte of the RELINQUISH message sent to the next computer is also set to zero.

These rules ensure that polling traffic takes precedence over network traffic, subject to a minimum of one network transfer per cycle of the master, and that no computer with network traffic to send gets precedence over any other.

It should be noted that the reservation byte NR of the incoming RELINQUISH is compared against the last recorded value in CNR rather than against the identity number of the computer. This ensures that if a computer fails while it has a reservation outstanding, network traffic can resume as normal after at most one additional cycle of the master around the ring.

As well as polling the work stations in the "connected" state, the computer also regularly polls the other work stations. If a response is received to the polling message, the state table is updated to indicate that the work station is now in the "connected" state.

The computer also regularly polls subsequent computers in the ring, between it and the next one known to be in the "connected" state, using a special form of message referred to as an INITIALISE message. If a response is received to this message, the state table entry is updated to indicate that the subsequent computer is now in the "connected" state. In this way, each computer can discover the next switched-on computer in the ring, so that it can pass the RELINQUISH message to it.

The polling of work stations and computers in the "disconnected" state is carried out at a lower rate than the polling of the "connected" work stations. Specifically, it is not carried out every time the polling counter expires, but only every nth time, where n is the initial polling count value for the device in question, held in its state table entry. This avoids an excessive amount of polling traffic.

Referring now to FIG. 3, this shows the formats of various messages that can be sent over the bus.

Figure 3A:
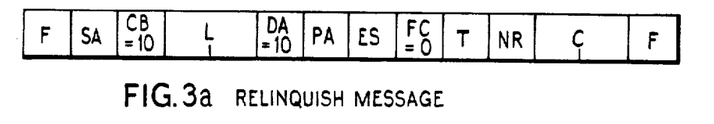
FIGS. 3a, 3b, 3c, 3d and 3e show the formats of various messages that can be sent in the system.

FIG. 3a shows the RELINQUISH message referred to above. This comprises a sequence of eight-bit bytes, as follows.

F: FLAG. This indicates the start of the message.

SA: Secondary address. This is the address of the intended recipient of the message. If this byte equals the hexadecimal value FF, the message is said to be in directed broadcast form and will be received by all the other computers in the network.

CB: Control byte. This is set to hexadecimal 10 in this case.

L: Length (2 bytes). This indicates the length of the message, in bytes.

DA: Device address. This is set to hexadecimal 10 in this case.

PA: Primary address. This is the address of the computer that sent the message.

ES: Embedded secondary address. Normally, this byte is ignored. However, in the case of a directed broadcast, it is used to hold the address of the computer that is intended to act upon the message. All the computers will receive the directed broadcast, but only this one will act on it.

FC: Function code. This is set to 0 in this case.

T: Token. This byte is used for detecting the occurrence of duplicate masters in the system. Each processor, when it passes on the master, remembers the value of this token in its current token register CT. When it receives the master again, it compares the token in the RELINQUISH message with CT. If they are different, there must be more than one master in the system.

NR: Network reservation byte. This is used for reserving the rights to transmit a network message.

C: Frame check (2 bytes). This is a check code for checking transmission of the message.

F: Flag. This indicates the end of the message.

Figure 3B:
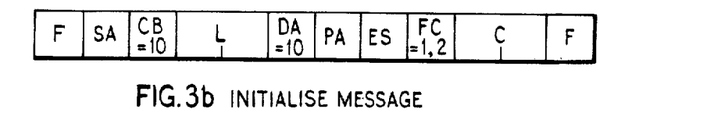

FIG. 3b shows the format of the INITIALISE message. This is similar to the RELINQUISH message, except that its function code FC is set to 1 or 2, and it contains no network reservation byte NR. When FC=1, the message is said to be in basic form, and when FC=2 the message is said to be in null form.

The INITIALISE message is used for the following purposes.

(a) It is used by the master to poll the other computers in the system which are currently indicated by the state table as being "disconnected" or "unknown", in order to find out whether they have come on-line yet. The basic form is used for this purpose.

(b) It is used by a computer during the contention mode of operation to signal to the other computers that it is attempting to become master. The null, directed broadcast form is used for this purpose.

Figure 3C:
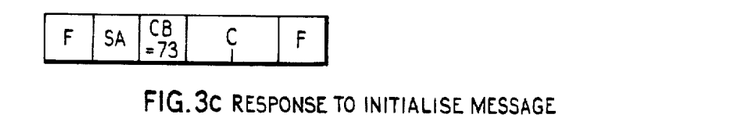

The computer to which the INITIALISE message is addressed (i.e. the one indicated by the embedded address ES in the case of a directed broadcast) should respond by sending a message back to the originating computer as shown in FIG. 3C, as follows.

F: Flag.

SA: Secondary address. This will be set equal to the primary address PA in the INITIALISE message.

CB: Control byte. This is set equal to the hexadecimal value 73.

C: Frame check.

F: Flag.

Figure 3D:
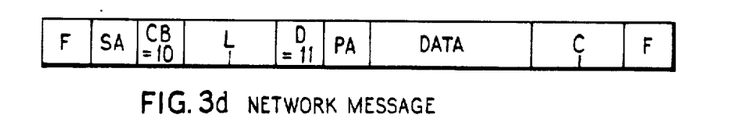

FIG. 3d shows the format of a NETWORK message. This is the form of message used for sending information from one of the computers to another computer, or to one of the work stations.

The NETWORK message comprises a flag F, secondary address SA, control byte CB, length bytes L, device address DA and primary address PA similar to the RELINQUISH message. In this case, however, the device address DA has the hexadecimal value 11. These bytes are followed by the actual message information, and finally by frame check bytes C and flag F.

Figure 3E:
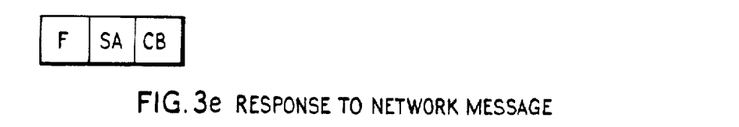

The computer to which the NETWORK message is addressed should respond by sending a message back to the originating computer as shown in FIG. 3e.

F: Flag.

SA: Secondary address. This will be set equal to the primary address PA in the NETWORK message.

CB: Control byte. This is set to hexadecimal value 11 if the receiving computer correctly received the message, 15 if the receiving computer was not ready to receive the message, IF if the receiving computer was in a disconnected state, and 97 if it rejected the message because an error was detected in the message.

Figure 4:
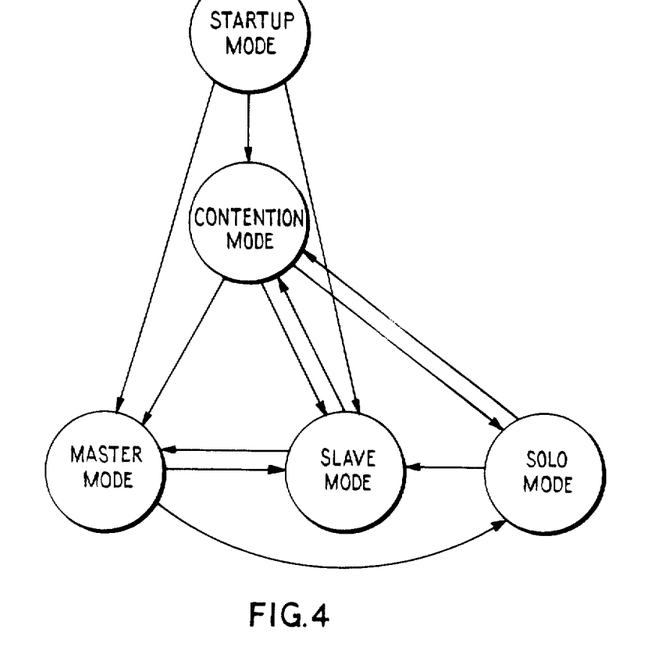
FIG. 4 is a state diagram showing the various modes of operation of each computer in the system.

Referring now to FIG. 4, this shows a state diagram of the various modes of operation of one of the computers.

The computer has five modes of operation, referred to as the START UP mode, CONNECTION mode, MASTER mode, SLAVE mode, and SOLO mode.

STARTUP mode

Figure 5:
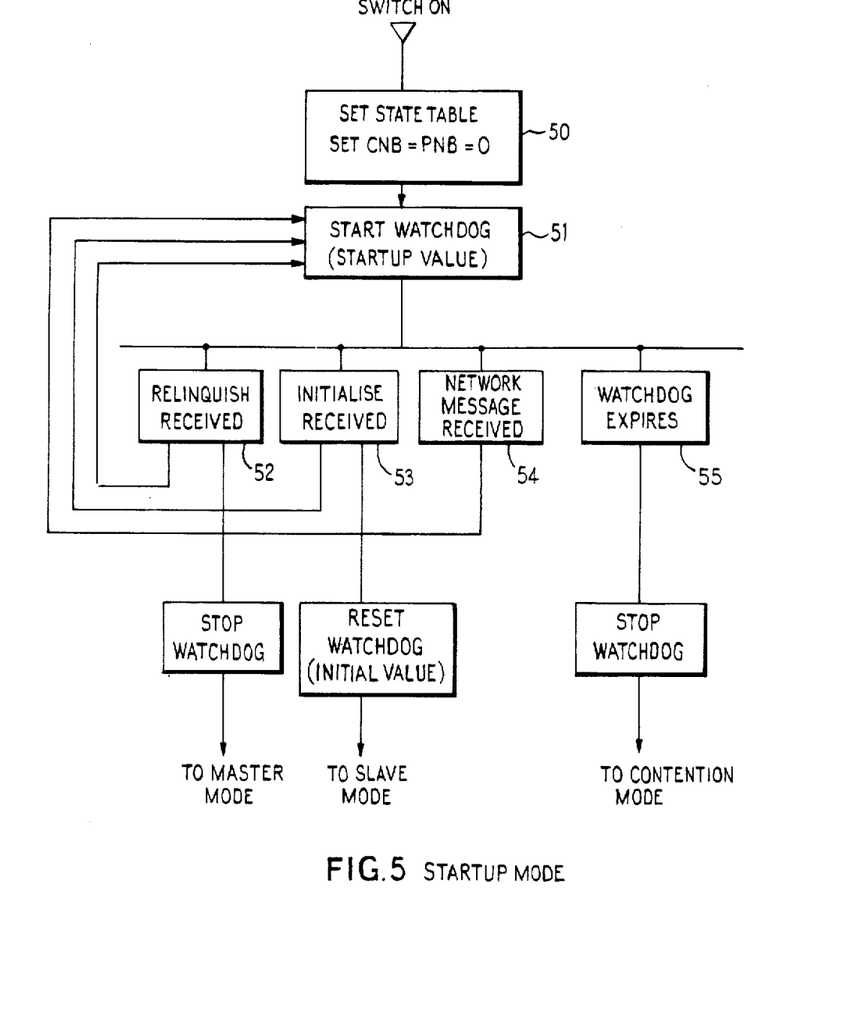
FIGS. 5–9 are flow diagrams illustrating the modes of operation in more detail.

Referring to FIG. 5, this shows the STARTUP mode in more detail. This mode is entered when the computer is first switched on.

The first action (box 50) in this mode is to set the state table, held in the RAM of the computer, to indicate that all the other computers and work stations are in the "disconnected" state, and the polling count value of each is set to 1. The current and previous network reservation bytes CNB and PNB are set to zero.

Start watchdog (box 51). The watchdog timer is then started, with its startup value.

RELINQUISH message received (box 52). If the computer now receives a RELINQUISH message in directed broadcast form, but the embedded secondary address ES does not match the address of this computer, the watchdog timer is reset to its start-up value, and the computer remains in the START-UP mode. If, on the other hand, the embedded address ES matches the address of this computer, or the message was specifically addressed to this computer (not in directed broadcast form) then the watchdog timer is switched off and the MASTER mode is entered.

INITIALISE message received (box 53). If the message is in directed broadcast form, and the embedded secondary address ES does not match the addres of this computer, then the watchdog timer is reset to its start-up value and the computer remains in STARTUP mode. If any other form of INITIALISE message is received, the watchdog timer is reset to its initial value, a response in the form shown in FIG. 2c is sent back to the computer that sent the message, the state table entry for that computer is set to indicate the "connected" state, and the SLAVE mode is entered.

NETWORK message received (box 54). The watchdog timer is restarted with its start-up value. A response in the form shown in FIG. 2e is sent back to the computer that originated the message, with the control byte CB set to 1F indicating "disconnected". The computer remains in STARTUP mode.

If any other message is received, no reply is sent, and the watchdog timer is allowed to continue running. The computer remains in STARTUP mode.

Watchdog expires (box 55). If the watchdog timer expires, it is stopped, and CONTENTION mode is entered.

Thus, it can be seen that when the computer is first switched on, it sets its watchdog timer to its start-up value and waits. If another computer in the network establishes contact with it by means of an INITIALISE message, the newly switched-on computer will respond, informing the other computer that it is now active. The other computer will then send it a RELINQUISH message, and it will enter the MASTER mode. If, on the other hand, the watchdog timer expires, the newly switched-on computer enters the CONTENTION mode in an attempt to assume the role of master.

CONTENTION MODE

Figure 6:
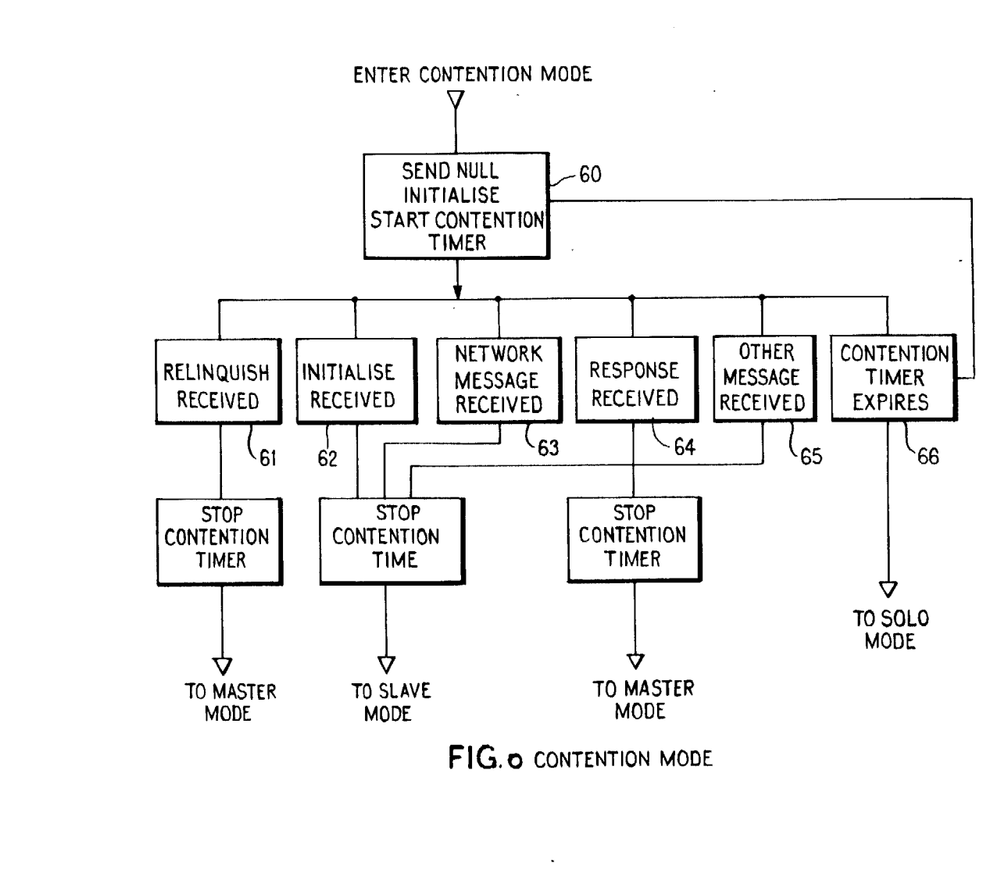

Referring to FIG. 6, this shows the CONTENTION mode in more detail.

The first action (box 60) in this mode is to generate an INITIALISE message as shown in FIG. 3b. This message is a directed broadcast (i.e. the secondary address SA is set to FF) and is in null form (i.e. the function code FC is set to 2). A new token value is generated at random and placed in the token field T, the network reservation byte NR is set to zero, and the embedded address ES is set to the address of the next computer in the ring. The contention repeat count CRC and the contention timer 27 are set to their initial values (see below) and the INITIALISE message is then sent over the bus.

If a RELINQUISH message is now received (box 61) the contention timer is stopped and MASTER mode is entered.

If an INITIALISE message is received (box 62) the contention timer is stopped and the SLAVE mode is entered with this message to process.

If a NETWORK message is received (box 63) the contention timer is stopped, and the SLAVE mode is entered with this message to process.

If a response in the form shown in FIG. 3c is received (box 64) the contention timer is stopped. The state table is updated, by setting the entry for the computer that returned the response to the "connected" state, while at the same time setting all the other entries to the "unknown" state. The MASTER mode is then entered.

If any other message is received (box 65), the SLAVE mode is entered with this message to process.

If the contention timer expires (box 66) before any message is received, the contention repeat count CRC is decremented. If the count has now expired, SOLO mode is entered. If, on the other hand, the count has not yet expired, the contention timer is reset to its initial value, and the INITIALISE message is sent again, this time with a new embedded address ES, so that it will be directed to the next again computer in the ring.

Thus, it can be seen that in the CONTENTION mode, the computer sends out INITIALISE messages at fixed intervals, determined by its contention timer. Each of these messages is in directed broadcast form, i.e. it is intended to be received by all the other computers, but invites a particular one of them (specified by the embedded addresses) to respond. If the specified computer does respond, then the first computer assumes that all the other computers also received the INITIALISE message, and that they have all gone into SLAVE mode. It therefore becomes the master.

The computer waits for a response during the whole of the interval between the INITIALISE messages. If a message other than a response to this message arrives during this interval, it knows that another computer has assumed the role of master, and so it enters the SLAVE mode.

The contention timer 27 in the different computers all have different starting values, so that the intervals between the INITIALISE messages are different for each computer. These intervals are all multiples of a basic time interval, and are chosen such that, whatever the phasing of the clocks on the different computers, one of the INITIALISE messages from one of the computers will always get through within a predetermined number of transmissions of the message. If no response is received during a particular interval, it could be because the INITIALISE message or the response to it was destroyed by contention on the bus, or because of an error, or because the address computer was not active. Hence, although it is guaranteed that one message will get through, the computer that sent the message will not necessarily receive a response to it. Therefore, if a computer does not detect any message after sending a predetermined number of INITIALISE messages (determined by the contention repeat count CRC) it assumes the role of master, even though it has not had a response to any of its INITIALISE messages. In this case, the computer goes into a special version of the MASTER mode, referred to as SOLO mode.

For example, in a system having eight computers, the intervals for the contention timers and the starting values of the contention repeat count CRC for the computers could be as follows.

| Computer number | 1 | 2 | 3 | 4 | 5 | 6 | 7 | 8 |
|---|---|---|---|---|---|---|---|---|
| Contention timer (milliseconds) | 20 | 40 | 60 | 100 | 140 | 160 | 260 | 340 |
| CRC start value | 4 | 3 | 3 | 2 | 2 | 2 | 1 | 1 |

These intervals are all integral multiples of a basic interval of 20 milliseconds. This basic interval is chosen to be significantly greater than the transmission turn-around time for an INITIALISE message and the response to that message, which in this case is around 2 milliseconds.

SLAVE MODE

Figure 7:
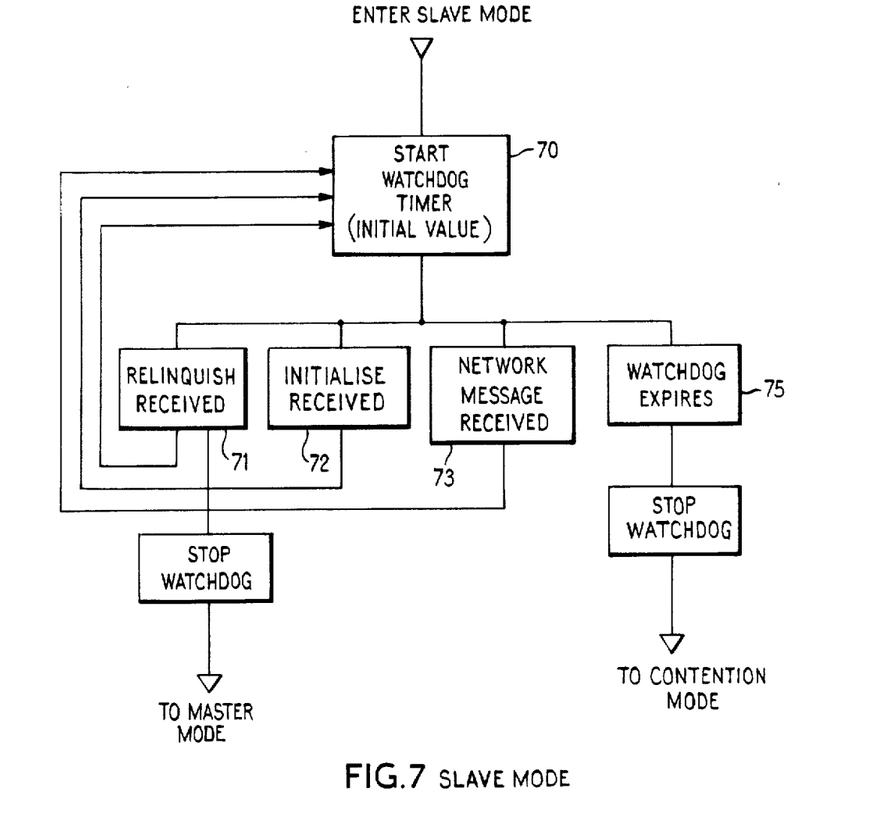

Referring to FIG. 7, this shows the SLAVE mode in more detail.

This mode is sometimes entered with a message to process. If so, the first action in the SLAVE mode is to process this message.

The watchdog timer is then set (box 70) to its initial value.

RELINQUISH message received (box 71). If the message is in directed broadcast form, but the embedded secondary address ES does not match this computer's address, then the watchdog timer is restarted with its initial value and the computer remains in SLAVE mode. Otherwise, the watchdog timer is switched off and the computer enters MASTER mode.

INITIALISE message received (box 72). If the message is not in directed broadcast form, or if the embedded seconary address ES matches the address of this computer, then a response in the form shown in FIG. 2c is sent back to the computer from which this INITIALISE came, and the state table entry for that computer is set to "connected". The watchdog timer is restarted with its initial value and the computer remains in SLAVE mode.

NETWORK message received (box 73). An appropriate response is sent to the message in the form shown in FIG. 2e. The state table entry for the comuter that sent the message is set to "connected". The watchdog timer is restarted with its initial value and the computer continues in SLAVE mode.

Watchdog expires (box 75). If no message has been received before the watchdog timer expires, the timer is stopped and the computer enters the CONTENTION mode.

MASTER MODE

Figure 8:
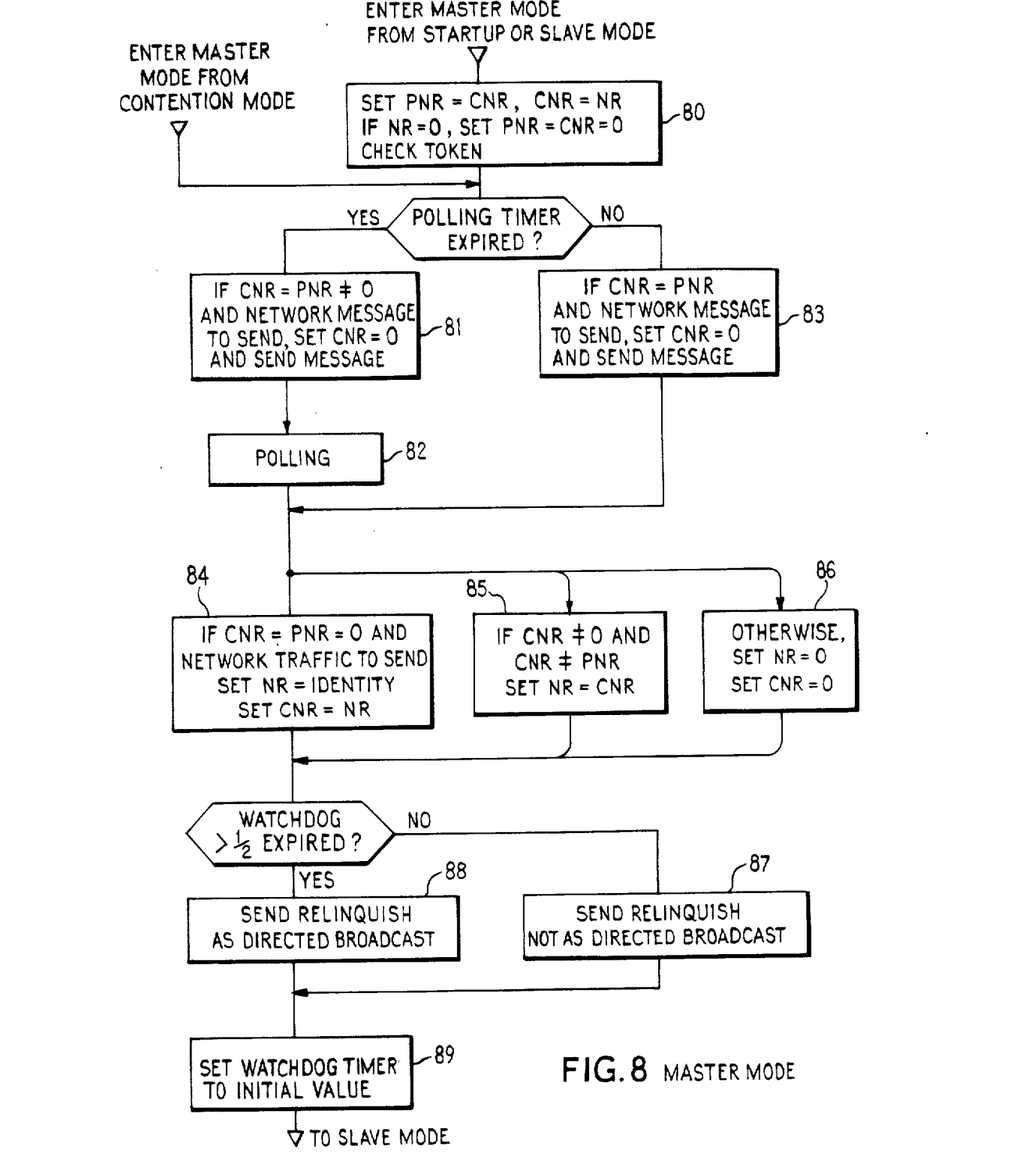

Referring now to FIG. 8, this shows the MASTER mode in more detail.

This mode can be entered as a result of receiving a RELINQUISH message when a STARTUP or SLAVE mode. In this case, the first action (box 80) in MASTER mode is to copy the current network reservation byte register CNR to the previous network reservation byte register PNR and then to copy the network reservation byte NR from the RELINQUISH message into CNR. However, if the network reservation byte in the message is zero, both CNR and PNR are set to zero. Also, the token T in the incoming message is compared with the current token register CT. If they are not equal, all the entries in the state table are set to the "unknown" state and the token T is copied into the current token register CT.

The polling timer is now examined, and further action is taken according to whether or not it has expired since it was last examined.

If the polling counter has expired, the following actions are performed. If CNR and PNR are equal and non-zero, this means that the computer has previously reserved the right to transmit a network message. Therefore, even though the polling counter has expired, the computer is allowed to send (box 81) one network message, subject to the transmission time link mentioned above. The network traffic is sent on a first-come, first-served basis. The computer then performs polling operations (box 82) to be described below.

If the polling counter has not expired, the following actions are performed. If CNR and PNR are equal, network traffic can be sent (box 83) subject to the transmission time limit. Again, the traffic is sent on a first-come, first-served basis. If, on the other hand, CNR and PNR are not equal, this means that another computer has reserved the right to transmit a network message, and therefore the present computer is not allowed to send any network traffic.

The computer then prepares to pass control to the next computer in the ring, by generating a RELINQUISH message. If CNR and PNR are both zero (i.e. if there is no outstanding network reservation) and if the computer still has network traffic to send, it sets the network reservation byte NR of the RELINQUISH message to its own identity number, so as to reserve the right to send a network message the next time it becomes master (box 84).

If CNR is non-zero and not equal to PNR, this means that a previous computer in the ring has made a reservation. This reservation is therefore passed on by copying the contents of CNR into the network reservation byte NR of the RELINQUISH message (box 85).

Otherwise, the network reservation byte NR of the RELINQUISH message is set to zero, to indicate that there is no outstanding reservation (box 86).

In all cases, the value of the network reservation byte NR is remembered by storing it in CNR.

The watchdog timer is now examined, and if it is not more than half expired, the RELINQUISH message is sent to a selected one of the other computers in normal addressed form (i.e. not as a directed broadcast) (box 87). If, on the other hand, the watchdog timer is more than half expired, the RELINQUISH message is sent in directed broadcast form, with the address of the selected computer embedded in it in the field ES (box 88). This ensures that all the other computers will receive the message and will therefore reset their watchdog timers, although only the computer specified by ES will become the master. Sending the RELINQUISH message in directed broadcast form in this way, when the watchdog timer is more than half expired, therefore ensures that the watchdog timers in all the computers are kept broadly in step with each other. Of course, this could be achieved by sending all RELINQUISH messages in directed broadcast form. However, directed broadcast messages generate an additional processing load in each of the computers, and it is therefore desirable to use them sparingly.

Finally, the watchdog timer of this computer is reset to its initial value (box 89) and the computer enters SLAVE mode.

POLLING

The polling operation (box 82) will now be described in more detail.

As mentioned above, each computer maintains in its RAM a state table, containing an entry for each other computer and for each work station belonging to it. Each entry consists of a state value, indicating that the computer or work station is in either a "connected", "disconnected" or "unknown" state, and a polling count value. The polling count indicates the frequency at which the computer or work station should be polled.

For a work station in the "connected" state, the polling count is set to 1, indicating that it should be polled every time the polling timer expires. This is necessary, as mentioned above, to ensure a suitably fast response to keystrokes.

For a computer in the "connected" state, the polling count is set to 0, indicating that it is not to be polled.

For a computer or work station in the "disconnected" state, the polling count is set to a predetermined number, greater than one, so that it is polled from time to time at a frequency lower than that at which the "connected" work stations are polled. The purpose of this polling is to discover whether these devices are switched on. In the present example, the polling count for a computer in the "disconnected" state is set to 25.

For a computer or work station in the "unknown" state, the polling count is set to 1.

During the polling operation (box 82), each entry in the state table is examined in turn. If the polling count in that entry is zero, no polling message is sent to the device in question.

If the polling count is non-zero, it is decremented by one. If the count is now zero, a polling message is sent to the device. A computer in the "unknown" state is polled by sending a null INITIALISE message not in directed broadcast form, while a computer in the "disconnected" state is polled by sending a basic INITIALISE message in directed broadcast form.

If a satisfactory response is received from the device to which a polling message is sent, the state table entry for that device is set to the "connected" state. If no response is received, or if an error occurred, the entry is set to the "disconnected" state.

SOLO MODE

Figure 9:
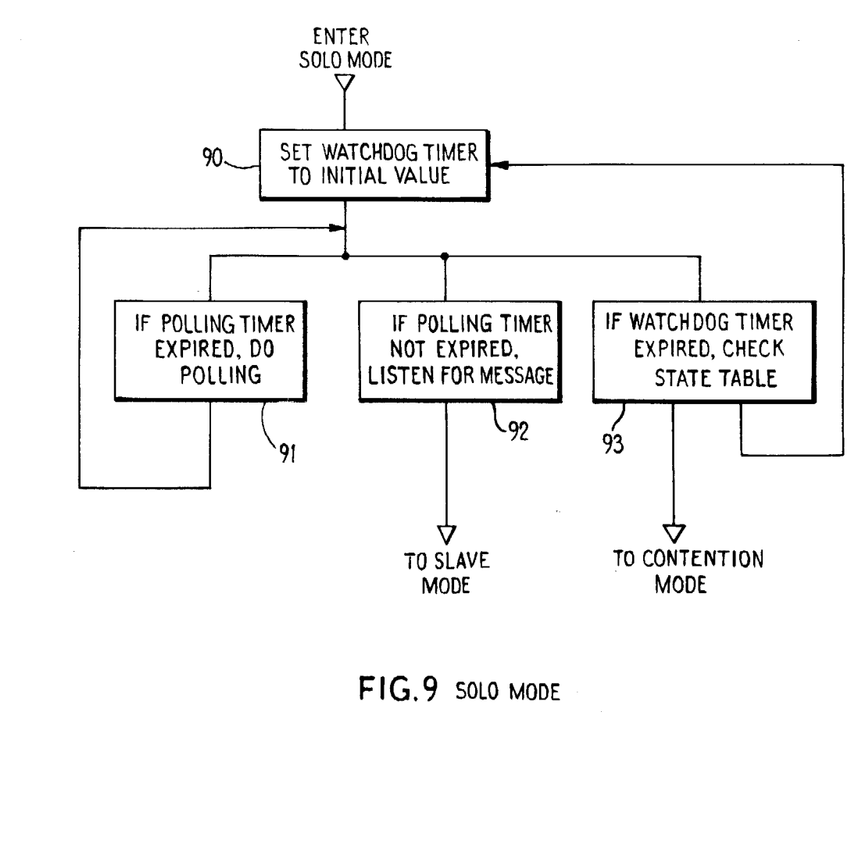

Referring to FIG. 9, this shows the SOLO mode in more detail.

The first action in this mode is to start the watchdog timer with its initial value (box 90). The subsequent actions depend on the states of the polling and watchdog timers.

If the polling timer has expired (box 91), polling actions are performed as described above for the MASTER mode. These will establish contact with any other life computers in the network.

If the polling timer has not expired (box 92) the computer listens for messages from other computers. If a message is received, this implies that there must be another master in the network and so the computer enters SLAVE mode.

If the watchdog timer expires (box 93), the state table is examined. If all the other computers are indicated as being "disconnected", the watchdog timer is stopped, and CONTENTION mode is entered. Otherwise, the watchdog timer is restarted with its initial value and the computer remains in SOLO mode.

I claim:

1. A computer network system comprising a message bus and a plurality of computers connected to the message bus, each computer having at least a master mode, a slave mode, and a contention mode, each computer comprising:
   (a) means operative in the master mode to send messages to the other computers over the bus and then to send a relinquish message to one of the other computers and to enter the slave mode,
   (b) means operative in the slave mode, for detecting a relinquish message on the bus from one of the other computers and then entering the master mode,
   (c) means operative in the slave mode, for monitoring the bus for messages destined for this computer and for entering the contention mode in the event that no messages are received within a predetermined time interval,
   (d) means operative in the contention mode, for repeatedly broadcasting a contention message over the bus at a predetermined repetition rate, the repetition rate for each computer being different from that of any other one of the computers,
   (e) means operative in the contention mode, following broadcasting of said contention message, in the event that a response to the contention message is received from another one of the computers, for entering the master mode, and
   (f) means operative in the contention mode, in the event that a contention message is received from another one of the computers, for sending a response to the contention message and entering the slave mode.

2. A system according to claim 1 wherein each computer also includes means operative in the contention mode, in the event that the contention message has been broadcast a predetermined number of times without receiving a response from another one of the computers, for entering the master mode.

3. A system according to claim 1 further including a plurality of workstations connected to the message bus, wherein the messages sent by each computer in the master mode comprise network messages, for information transfer, and polling messages, for requesting said workstations to return information, and wherein each computer further includes
   (a) a polling timer having a predetermined time-out period,
   (b) means operative when the time-out period of the polling timer expires, for sending a polling message to a group of said workstations when the computer is in the master mode.

4. A system according to claim 3 wherein each computer further includes means operative in the master mode, when the time-out period of the polling timer has expired, for reserving a right to send a network message, and means operative in the master mode, when the time-out period of the polling timer has expired, for permitting the computer to send one network message only if it has previously reserved the right to do so.

5. A system according to claim 4 wherein the means for reserving the right to send a message comprises means for setting a reservation field in the relinquish message to a value unique to the computer, and wherein the means for permitting the computer to send one message comprises means for comparing the reservation field in a relinquish message received by the computer with the value of the reservation field in the last relinquish message sent by the computer.

6. A system according to claim 1 wherein said predetermined repetition rate has a period equal to an integral multiple of a basic time interval, the basic time interval being substantially greater than the transmission turnaround time for a contention message and the response to that message.

7. In a computer system comprising a message bus and a plurality of computers connected to the bus, a method of operating each computer comprising the steps:
   (a) operating the computer in at least three modes of operation, including a master mode, a slave mode, and a contention mode, (b) in the master mode, sending messages to the other computers over the bus, sending a relinquish message to one of the other computers, and then entering the slave mode, (c) in the slave mode, monitoring the bus for messages destined for this computer and entering the contention mode in the event that no messages are received within a predetermined time interval, and (d) in the contention mode
   (i) repeatedly broadcasting a contention message over the bus at a predermined repetition rate, the repetition rate for each computer being different from that for each other computer,
   (ii) entering the master mode in the event that, following broadcasting of said contention message, a response to the contention message is received from another one of the computers, and
   (iii) in the event that a contention message is received from another one of the computers, sending a response to the contention message and entering the slave mode.

8. A method according to claim 7 including the further step of entering the master mode after a further step of entering the master mode after a predetermined number of contention messages have been broadcast in the contention mode without receiving a response from another one of the computers.

9. A method according to claim 7 wherein said predetermined repetition rate has a period equal to an integral multiple of a basic time interval, the basic time interval being substantially greater than the transmission turnaround time for a contention message and the response to that message.

* * * * *